United States Patent [19]

Nagai

[11] Patent Number: 4,607,340

[45] Date of Patent: Aug. 19, 1986

[54] LINE SMOOTHING CIRCUIT FOR GRAPHIC DISPLAY UNITS

[75] Inventor: Toshihisa Nagai, Tokyo, Japan

[73] Assignee: Seiko Instruments & Electronics Ltd., Tokyo, Japan

[21] Appl. No.: 674,074

[22] Filed: Nov. 23, 1984

[30] Foreign Application Priority Data

Nov. 25, 1983 [JP] Japan ................................ 58-221594

[51] Int. Cl.⁴ ................................................ G06F 3/14

[52] U.S. Cl. ..................................... 364/521; 364/900; 364/551; 340/799

[58] Field of Search ............... 364/551, 523, 518, 718, 364/900, 720, 85 L, 853, 521; 354/4, 12; 340/728, 729, 732, 748, 736, 742, 744, 799

[56] References Cited

U.S. PATENT DOCUMENTS

| | | | |
|---|---|---|---|
| 3,675,208 | 7/1972 | Bard | 364/900 |
| 4,070,710 | 1/1978 | Sukonick et al. | 364/900 |
| 4,205,389 | 5/1980 | Heartz | 364/521 |
| 4,365,305 | 12/1981 | MacDonald et al. | 364/521 |

*Primary Examiner*—Edward J. Wise

*Attorney, Agent, or Firm*—Robert E. Burns; Emmanuel J. Lobato; Bruce L. Adams

[57] ABSTRACT

A line smoothing circuit for graphic display units, comprising a drawing data computing device for determining the dot data, direction data and correction amount data with reference to the line vector-indicating starting point coordinates and terminal point coordinates, memory for storing said data correspondingly to addresses on a display picture frame, and a position-correcting device for reading the data from said memory and determining the generation timing of the dot data on the rasters by calculating the dot location from the data or preceding address and line.

18 Claims, 12 Drawing Figures

LINE SMOOTHING CIRCUIT FOR GRAPHIC DISPLAY UNITS

BACKGROUND OF THE INVENTION

1. Technical Field

This invention relates to a line smoothing circuit capable of indicating a straight line smoothly on a raster scan type graphic display unit.

2. Prior Art

A raster scan type graphic display unit is an apparatus for displaying a graphic form while controlling the luminance of a CRT raster on the basis of the graphic data which are expressed by an aggregate of line vectors defined by the coordinates of a starting point $(x_i, y_i)$ and a terminal point $(x_{i+1}, y_{i+1})$ as shown in FIG. 8.

The controlling of the luminance is done by carrying out the computation, $$Y = \frac{y_{i+1} - y_i}{x_{i+1} - x_i} \cdot X + 0.5$$

on the basis of a value of the coordinates of a starting point $(x_i, y_i)$ and a terminal point $(x_{i+1}, y_{i+1})$, which are expressed by the graphical data, by a computing means A, outputting a "1" signal as the image data into the addresses (X, Y) in which the integer parts exist to store the "1" signal in an image memory B, and reading the signal synchronously with a read signal from a read control means C, as shown in FIG. 7.

However, since one straight line is expressed by discrete numerical values, the straight lines (FIGS. 9A and 10A) extending diagonally near the horizontal and vertical axes are displayed in a stepped manner as shown in FIGS. 9B and 10B. Accordingly, bent parts occur, and although these bent parts are difficult to be seen because they are so small, the lines nevertheless do not appear as smooth straight lines.

Such a problem can be solved by increasing the density of the display dots but an increase in the density of the display dots makes it necessary to increase the capacity of an image memory to a great extent.

SUMMARY OF THE INVENTION

An object of the present invention is to overcome the aforementioned drawbacks and to provide a line smoothing circuit for raster scan type graphic display units which is capable of displaying a straight line smoothly by using small-capacity memories.

DETAILED DESCRIPTION OF INVENTION

The details of the present invention will now be described on the basis of an illustrated embodiment thereof.

Figure 1:
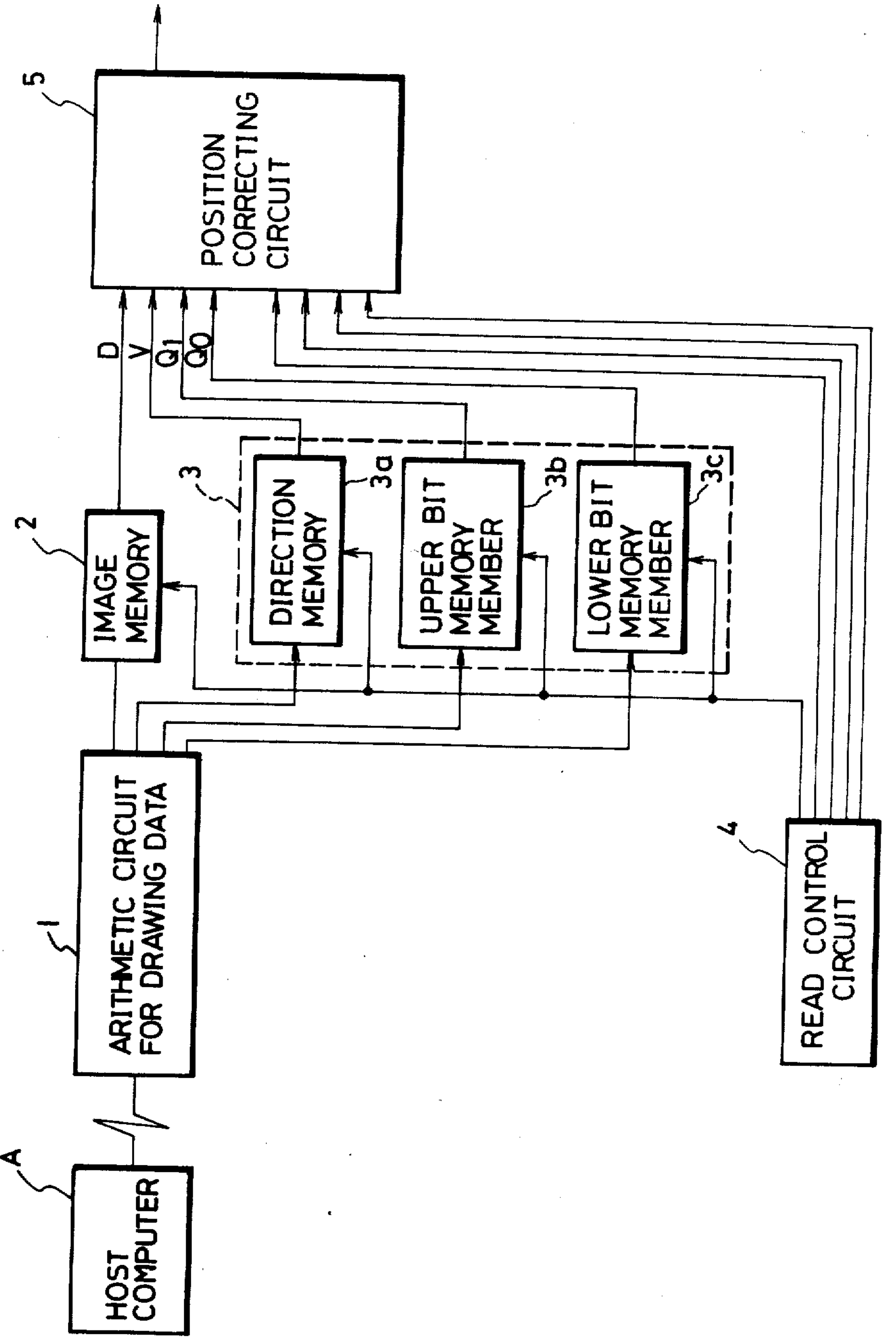
FIG. 1 is a block diagram of an embodiment of a device according to the present invention.

FIG. 1 is a block diagram of an embodiment of the device according to the present invention. Referring to the drawing, reference numeral 1 denotes an arithmetic circuit for drawing data.

The arithmetic circuit 1 is connected to receive the starting point coordinates $(x_i, y_i)$ and the terminal point coordinates $(x_{i+1}, y_{i+1})$ of line vectors which are sent from a host computer A. The arithmetic circuit 1 is adapted to compute the following equation (1) when the X component of the line vector is larger than the Y component, or to compute the following equation (2) when the Y component is larger than the X component.

$$Y = \frac{y_{i+1} - y_i}{x_{i+1} - x_i} \cdot X \quad (1)$$

$$X = \frac{x_{i+1} - x_i}{y_{i+1} - y_i} \cdot Y \quad (2)$$

In the case of equation (1), the circuit 1 computes the Y value by incrementing the X value one by one. The above X and the integer part of Y are used as the addresses for an image memory 2 and a correcting memory 3. For each X value, a dot data D (x, y) is generated to be stored in the image memory 2 at the corresponding X,Y address location. The fractional parts of the Y value are used as a correction amount data, Q (x, y), which indicates the accurate position for displaying the above dot data D (x, y). When Q (x, y) is not zero, the direction data V (x, y) is set to 1. This means that the dot data must be corrected in the vertical direction. These data V and Q are stored in the correction memory 3 at the same location as the dot data D.

In the case of equation (2), X is computed by incrementing Y one by one, and by processing in a similar manner as equation (1), except for the fact that the direction data V (x, y) is always set to 0. This means that correction is carried out in the horizontal direction.

Reference numeral 2 denotes the above-mentioned image memory for storing the dot data D (x, y) outputted from the arithmetic circuit 1 for drawing data, and 3 denotes the correcting memory consisting of a direction memory member 3*a* for storing the direction data V (x, y), a memory member 3*b* for storing an upper bit $Q_1$ (x, y) of the correction amount data Q (x, y) and a memory member 3*c* for storing a lower bit $Q_0$ (x, y) thereof.

Figure 3:
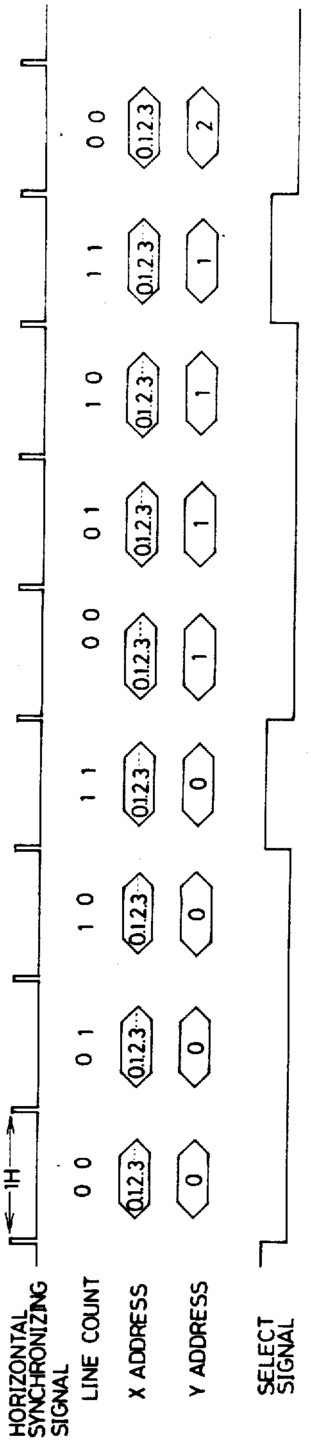
FIGS. 3 and 4 are timing charts showing the waveforms of signals in a read control circuit in the same device.
Figure 4:
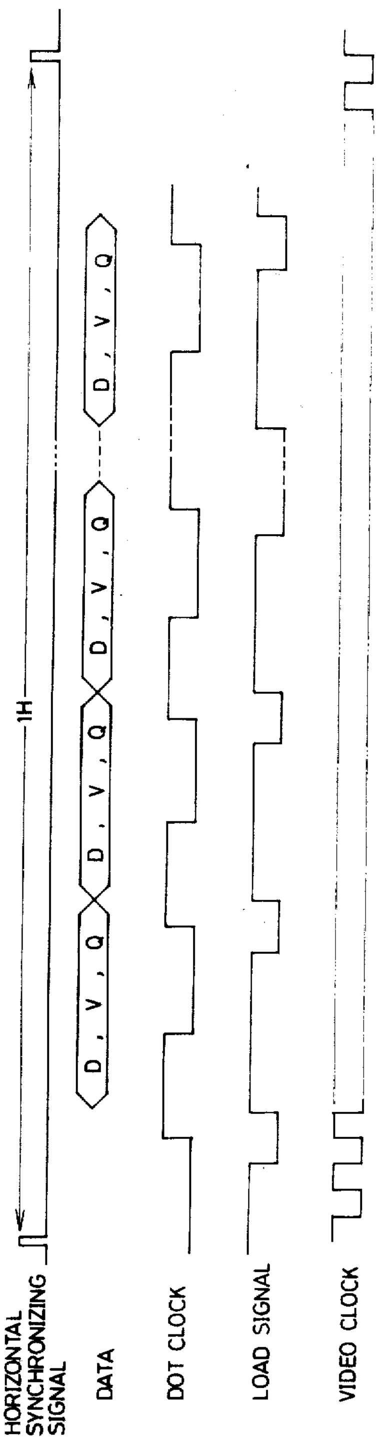

The image memory 2 and correction memory 3 are formed in layer and adapted to be read in parallel by a read signal from a read control circuit 4 which will be described later. The read control circuit 4 is adapted to output vertical and horizontal synchronizing signals for driving a CRT which forms a raster type display as shown in FIGS. 3 and 4, and also a read signal for the image memory 2 and correcting memory 3, a selecting signal for driving a position correcting circuit 5 which will be described later, and correction control signals, such as a dot clock signal CK1, line count signals $l_1$, $l_0$, a load signal and a video clock signal CK2. The position correcting circuit 5 is adapted to correct the position of a picture element by shifting the picture element on the basis of the data read from the image memory 2 and correcting memory 3.

TABLE 1

PX decoder

| Input | | | Output | | | |
|---|---|---|---|---|---|---|
| V (x,y) | $Q_1$ (x,y) | $Q_0$ (x,y) | $PX_1$ | $PX_2$ | $PX_3$ | $PX_4$ |
| 0 | 0 | 0 | 1 | 1 | 1 | 1 |
| 0 | 0 | 1 | 1 | 1 | 1 | 0 |
| 0 | 1 | 0 | 1 | 1 | 0 | 0 |
| 0 | 1 | 1 | 1 | 0 | 0 | 0 |
| 1 | — | — | 1 | 1 | 1 | 1 |

TABLE 2

PY selector

| Input | | | Line count | | | |
|---|---|---|---|---|---|---|
| V (x,y) | $Q_1$ (x,y) | $Q_0$ (x,y) | 00 | 01 | 10 | 11 |
| 0 | — | — | 1 | 1 | 1 | 1 |
| 1 | 0 | 0 | 1 | 1 | 1 | 1 |
| 1 | 0 | 1 | 0 | 1 | 1 | 1 |
| 1 | 1 | 0 | 0 | 0 | 1 | 1 |
| 1 | 1 | 1 | 0 | 0 | 0 | 1 |

TABLE 3

LX decoder

| Input | | | Output | | | |
|---|---|---|---|---|---|---|
| V (x-1,y) | $Q_1$ (x-1,y) | $Q_0$ (x-1,y) | $LX_1$ | $LX_2$ | $LX_3$ | $LX_4$ |
| 0 | 0 | 0 | 0 | 0 | 0 | 0 |
| 0 | 0 | 1 | 0 | 0 | 0 | 1 |
| 0 | 1 | 0 | 0 | 0 | 1 | 1 |
| 0 | 1 | 1 | 0 | 1 | 1 | 1 |
| 1 | — | — | 0 | 0 | 0 | 0 |

TABLE 4

UY selector

| Input | | | Line count | | | |
|---|---|---|---|---|---|---|
| V (x,y-1) | $Q_1$ (x,y-1) | $Q_0$ (x,y-1) | 00 | 01 | 10 | 11 |
| 0 | — | — | 0 | 0 | 0 | 0 |
| 1 | 0 | 0 | 0 | 0 | 0 | 0 |
| 1 | 0 | 1 | 1 | 0 | 0 | 0 |
| 1 | 1 | 0 | 1 | 1 | 0 | 0 |
| 1 | 1 | 1 | 1 | 1 | 1 | 0 |

Figure 2:
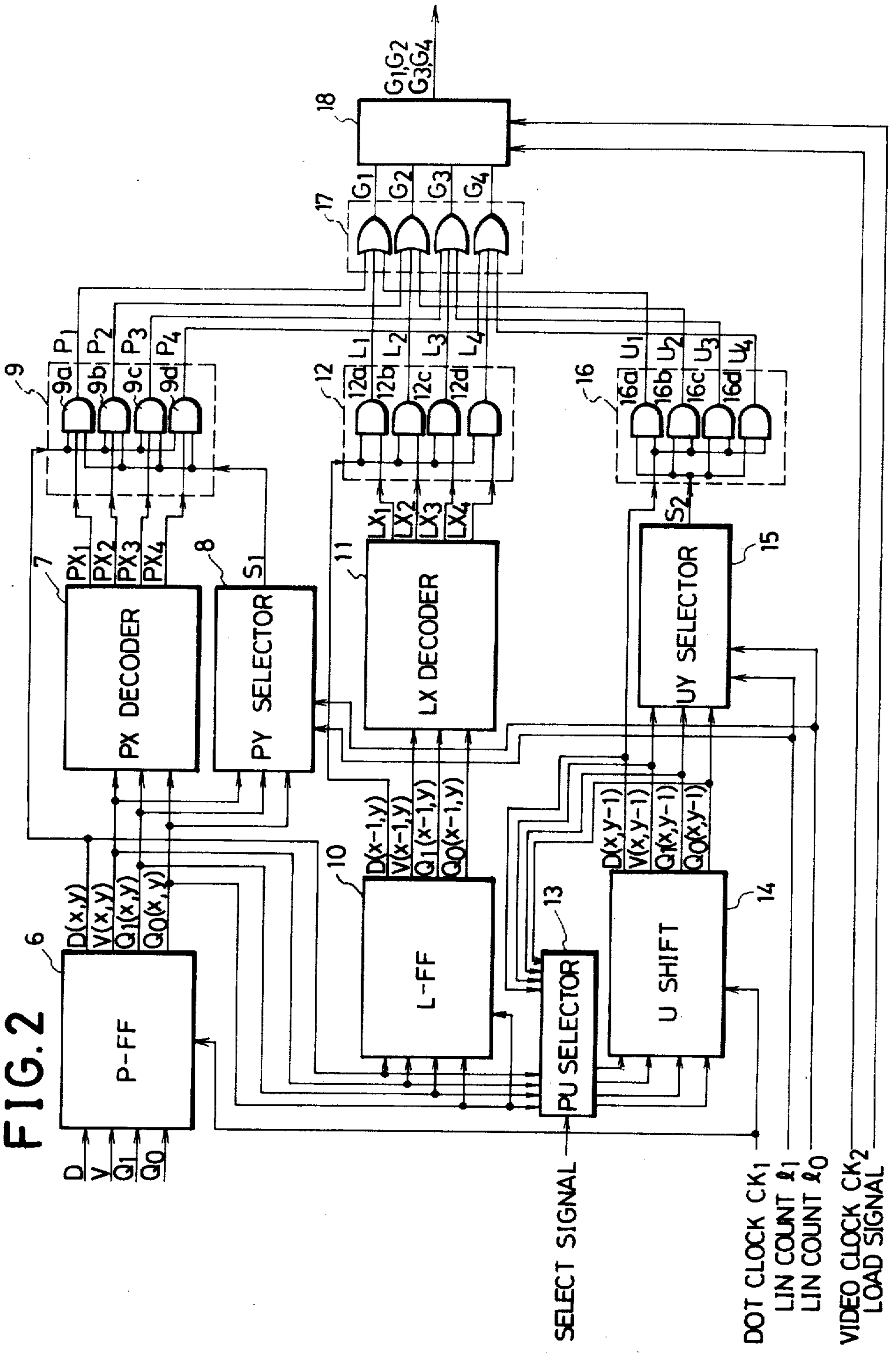
FIG. 2 is a block diagram of an example of a position correcting circuit in the same device.

FIG. 2 is a block diagram of an example of the position correcting circuit 5. Referring to the drawing, reference numeral 6 denotes a present-time data-taking flip-flop (which will hereinafter be referred to as "P-FF") adapted to latch and output the dot data D (x, y) at the present time, i.e. on the address (X, Y) from the image memory 2 and correcting memory 3, and the direction data V (x, y) and correction amount data $Q_1$ (x, y), $Q_0$ (x, y) synchronously with a dot clock signal $CK_1$ from the read control circuit. Reference numeral 7 denotes a PX decoder adapted to output a "1, 1, 1, 1" signal when a truth value, i.e. a correction amount, which is shown in Table 1 on the basis of the direction data V (x, y) and correction amount data $Q_1$ (x, y), $Q_0$ (x, y) from P-FF 6, is zero, or when there is the direction correction, and "1" signals the number of which is inversely proportional to a correction amount when any correction amount exists. Reference numeral 8 denotes a PY selector adapted to select one signal from the signals determined by a truth value, which is shown in Table 2 on the basis of the direction data and correction amount data output from the P-FF 6, as a line count signal, i.e. when there is no direction correction, output a "1" signal irrespective of the line count, and when there is the direction correction, output a "1" signal in inverse proportion to a correction amount at the time of which the line count number is over the given number. Reference numeral 9 denotes a gate (which will hereinafter be referred to as "P-gate") for preparing the picture element data based on the data on the address (X, Y) which is being read at present. This P-gate consists of four AND-circuits 9*a*, 9*b*, 9*c*, 9*d*. As a common signal, the dot data D (x, y) from the P-FF6 and a selector signal $S_1$ from the PY selector 8 are inputted into two input terminals of each of these AND-circuits, and respective ones of the output signals from the PX decoder 7 are applied to the remaining one input terminal of each thereof. When both the dot data and a signal from the PY selector 8 are "1" signals, a signal corresponding to a signal from the PX decoder 7 is outputted, and 0, 0, 0, 0 in the other case.

Reference numeral 10 denotes a preceding data-taking flip-flop (which will hereinafter be referred to as "L-FF") adapted to latch and output the dot data D (x−1, y) and correction data V (x−1, y), Q (x−1, y) on the address (X−1, Y), which is one before the address being read at present by the P-FF6, synchronously with a dot clock signal CK1. Reference numeral 11 denotes a LX decoder adapted to output the data determined by a truth value shown in Table 3 on the basis of the direction data V (x−1, y) and correction amount data $Q_1$ (x−1, y), $Q_0$ (x−1, y) from the L-FF 10, i.e. the LX decoder outputs a (0, 0, 0, 0) signal when the correction amount is zero or when there is the direction correction, and outputs "1" signals, the number of which is proportional to the correction amount, when there is any correction amount. Reference numeral 12 denotes a horizontal picture element data preparing gate (which will hereinafter be referred to as "L-gate") for outputting data concerning the connection in the raster direction. The L-gate consists of four AND-circuits 12*a*, 12*b*, 12*c*, 12*d*. The dot data D (x−1, y) from the L-FF 10 are inputted into one input terminal of each of the four circuits, and a signal from the LX decoder 11 is input into the other input terminals. When a "1" signal exists in the dot data on the preceding address (x−1, y), a signal corresponding to an output from the LX decoder 11 is outputted. When a "1" signal does not exist in the mentioned dot data, a (0, 0, 0, 0) signal is outputted. Reference numeral 13 denotes a PU selector adapted to output the data, which are being read by the P-FF 6, to a preceding data-taking shift register 14 during the period in which the line count signals $l_1$, $l_0$ are (1,1), i.e. during the fourth scanning of the raster.

Reference numeral 14 denotes the above-mentioned preceding data-taking shift register (which will hereinafter be referred to as U shift register) adapted to read the dot data D (x, y−1) and correction data V (x, y−1), $Q_1$ (x, y−1), $Q_0$ (x, y−1), which are read in the preceding step, synchronously with the dot clock signal CK1 to output them in accordance with the X address for the data to be taken in by the P-FF 6. Reference numeral 15 denotes a UY selector adapted to select one signal on the basis of the count signals $l_1$, $l_0$ from the truth values which are determined by the direction correction data V (x, y−1) and correcting amount data $Q_1$ (x, y−1), $Q_0$ (x, y−1) from the U shift register 14 with reference to the truth values shown in Table 4. Thus, when there is no direction correction or no correction amount, a "0" signal is outputted, and, when there is a correction amount, a "1" signal is outputted continuously until the number of the line count signal becomes large in proportion to the correction amount. Reference numeral 16 denotes a line lifting picture element data gate (which will hereinafter be referred to as "U-gate") consisting of four AND-gates 16*a*, 16*b*, 16*c*, 16*d* and connected to receive at one input terminal of each thereof the dot data from the U-shift register 14, and at the other input terminal of each thereof a selecting signal $S_2$ from the UY selector 15. When the input signals into two input terminals of each AND gate are "1" signals, (1, 1, 1, 1) are outputted.

Reference numeral 17 denotes an output gate consisting of three input terminal-carrying OR-gate circuits 17*a*, 17*b*, 17*c*, 17*d*. The first input terminal is connected to receive a signal from the P-gate circuit 9, the second input terminal a signal from the L-gate circuit 12, and the third input terminal a signal from the U-gate circuit 16. The logical sum of the data from each gate with respect to each bit is taken to be synthesized, and image signals $G_1$, $G_2$, $G_3$, $G_4$ are outputted in parallel. Reference numeral 18 denotes a parallel-serial converting shift register adapted to be latched when a load signal is in the L-level, and output $G_4$, $G_3$, $G_2$, $G_1$ bit by bit in the mentioned order synchronously with a video lock signal when a load signal is in the H-level.

The operation of the device thus constructed will now be described.

Figure 9A:
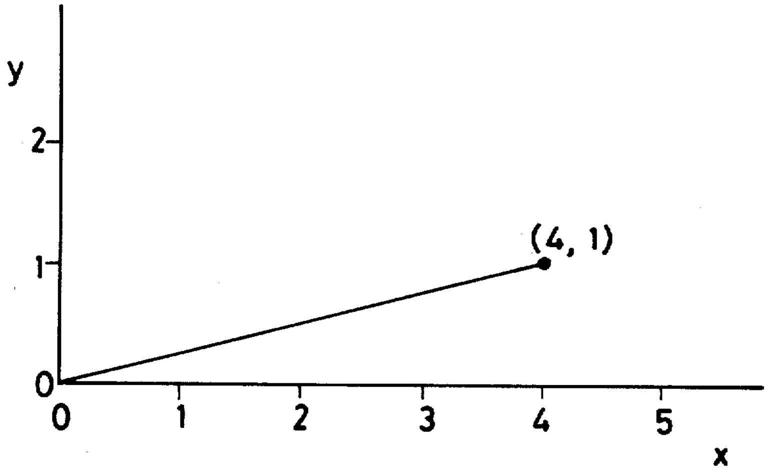
PRIOR ART FIG. 9A
FIGS. 9A-9B and 10A-10B illustrate a line vector and an example of a picture frame of a conventional graphic display, respectively.
Figure 9B:
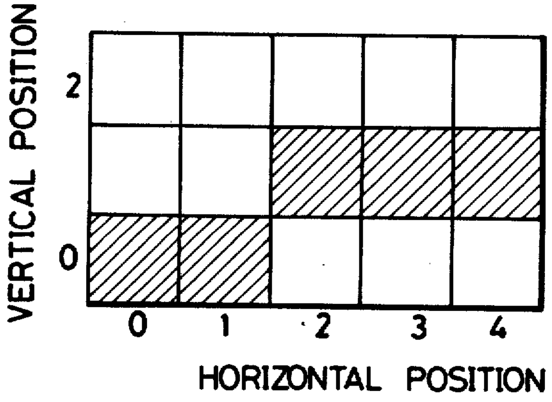
PRIOR ART FIG. 9B

The operation of the device will be described with reference to an example having the vector shown in FIG. 9A, which expresses a straight line with the coordinates of its starting point of (0, 0) and those of its terminal point of (4, 1), and on the basis of Table 5.

TABLE 5

| | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| Number of line | | | | 0 | | | | | 1 | | | | | 2 | | | | | 3 | | | | | 4 | | | | | 5 | | | | | 6 | | | | | 7 | | |
| Line count | | | 0 | 0 | | | | 0 | 1 | | | | 1 | 0 | | | | 1 | 1 | | | | 0 | 0 | | | | 0 | 1 | | | | 1 | 0 | | | | 1 | 1 | | |
| Reading address | X | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
| on memory | Y | | | | | | | | | | 0 | | | | | | | | | | | | | | | | | | | | 1 | | | | | | | | | | |
| P | D (x, y) | * | * | * | * | | * | * | * | * | | * | * | * | * | | * | * | * | * | | | | | | * | | | | | * | | | | | * | | | | | * |
| I | V (x, y) | | * | * | * | | | * | * | * | | | * | * | * | | | * | * | * | | | | | | | | | | | | | | | | | | | | | |
| F | $Q_1$ (x, y) | | | * | * | | | | * | * | | | | * | * | | | | * | * | | | | | | | | | | | | | | | | | | | | | |
| F | $Q_0$ (x, y) | | * | | * | | | * | | * | | | * | | * | | | * | | * | | | | | | | | | | | | | | | | | | | | | |
| Selecting signal $S_1$ | | * | | | | * | * | * | | | * | * | * | * | | * | * | * | * | * | * | * | * | * | * | * | * | * | * | * | * | * | * | * | * | * | * | * | * | * | * |
| P- | $P_1$ | * | | | | | * | * | | | | * | * | * | | | * | * | * | * | | | | | | * | | | | | * | | | | | * | | | | | * |
| gate | $P_2$ | * | | | | | * | * | | | | * | * | * | | | * | * | * | * | | | | | | * | | | | | * | | | | | * | | | | | * |
| | $P_3$ | * | | | | | * | * | | | | * | * | * | | | * | * | * | * | | | | | | * | | | | | * | | | | | * | | | | | * |
| | $P_4$ | * | | | | | * | * | | | | * | * | * | | | * | * | * | * | | | | | | * | | | | | * | | | | | * | | | | | * |
| L | D (x-1, y) | | | | | | | * | * | * | * | | * | * | * | * | | * | * | * | * | | | | | | | | | | | | | | | | | | | | |
| | V (x-1, y) | | | | | | | | * | * | * | | | * | * | * | | | * | * | * | | | | | | | | | | | | | | | | | | | | |
| F | Q (x-1, y) | | | | | | | | | * | * | | | | * | * | | | | * | * | | | | | | | | | | | | | | | | | | | | |
| F | Q (x-1, y) | | | | | | | | * | | * | | | * | | * | | | * | | * | | | | | | | | | | | | | | | | | | | | |
| L- | $L_1$ | | | | | | | | | | | | | | | | | | | | | | | | | | | | | | | | | | | | | | | | |
| gate | $L_2$ | | | | | | | | | | | | | | | | | | | | | | | | | | | | | | | | | | | | | | | | |
| | $L_3$ | | | | | | | | | | | | | | | | | | | | | | | | | | | | | | | | | | | | | | | | |
| | $L_4$ | | | | | | | | | | | | | | | | | | | | | | | | | | | | | | | | | | | | | | | | |
| U- | D (x, y-1) | | | | | | | | | | | | | | | | | | | | | * | * | * | * | | * | * | * | * | | * | * | * | * | | * | * | * | * | |
| shift | V (x, y-1) | | | | | | | | | | | | | | | | | | | | | | * | * | * | | | * | * | * | | | * | * | * | | | * | * | * | |
| | Q (x, y-1) | | | | | | | | | | | | | | | | | | | | | | | * | * | | | | * | * | | | | * | * | | | | * | * | |
| | Q (x, y-1) | | | | | | | | | | | | | | | | | | | | | | * | | * | | | * | | * | | | * | | * | | | * | | * | |
| Selecting signal $S_2$ | | | | | | | | | | | | | | | | | | | | | | | * | * | * | | | | * | * | | | | | * | | | | | | |
| U- | $U_1$ | | | | | | | | | | | | | | | | | | | | | | * | * | * | | | | * | * | | | | | * | | | | | | |
| gate | $U_2$ | | | | | | | | | | | | | | | | | | | | | | * | * | * | | | | * | * | | | | | * | | | | | | |
| | $U_3$ | | | | | | | | | | | | | | | | | | | | | | * | * | * | | | | * | * | | | | | * | | | | | | |
| | $U_4$ | | | | | | | | | | | | | | | | | | | | | | * | * | * | | | | * | * | | | | | * | | | | | | |
| Out- | $G_1$ | * | | | | | * | * | | | | * | * | * | | | * | * | * | * | | | * | * | * | * | | | * | * | * | | | | * | * | | | | | * |
| put | $G_2$ | * | | | | | * | * | | | | * | * | * | | | * | * | * | * | | | * | * | * | * | | | * | * | * | | | | * | * | | | | | * |
| gate | $G_3$ | * | | | | | * | * | | | | * | * | * | | | * | * | * | * | | | * | * | * | * | | | * | * | * | | | | * | * | | | | | * |
| | $G_4$ | * | | | | | * | * | | | | * | * | * | | | * | * | * | * | | | * | * | * | * | | | * | * | * | | | | * | * | | | | | * |

When a vector signal as the graphical data is inputted from the host computer A into the arithmetic circuit 1 with the memories cleared to store a "0" signal therein, $Y=\frac{1}{4}\cdot X=0.25X$ is determined on the basis of the formula (1), i.e.

$$Y = \frac{y_{i+1} - y_i}{x_{i+1} - x_i} \cdot X,$$

and a value of Y by substituting X=0, 1, 2, 3 and 4, i.e. with respect to (X=0, Y=0), (X=1, Y=0.25), (X=2, Y=0.5), (X=3, Y=0.75) and (X=4, Y=1). On the basis of these results, a "1" signal is outputted to the address (X, Y) consisting of integer parts of X and Y, i.e. (0, 0), (1, 0), (2, 0), (3, 0), (4, 1), a "0" signal as the dot data D (x, y) to the other addresses, a "1" signal as the direction data V (x, y) to the addresses in which a value of Y has a fraction part, i.e. (1, 0), (2, 0), (3, 0), and numbers, which are obtained by converting the values of these fraction parts into binary numbers, as the correction amount data $Q_1$ (x, y), $Q_0$ (x, y) to store the data shown in Tables 6, 7, 8a and 8b in each of the image memory 2 and correction memory 3.

TABLE 6

| Y address | | | | | |
|---|---|---|---|---|---|
| 2 | 0 | 0 | 0 | 0 | 0 |
| 1 | 0 | 0 | 0 | 0 | 1 |
| 0 | 1 | 1 | 1 | 1 | 0 |
| X address | 0 | 1 | 2 | 3 | 4 |

TABLE 7

| Y address | | | | | |
|---|---|---|---|---|---|
| 2 | 0 | 0 | 0 | 0 | 0 |
| 1 | 0 | 0 | 0 | 0 | 0 |
| 0 | 0 | 1 | 1 | 1 | 0 |
| X address | 0 | 1 | 2 | 3 | 4 |

TABLE 8(a)

| Y address | | | | | |
|---|---|---|---|---|---|
| 2 | 0 | 0 | 0 | 0 | 0 |
| 1 | 0 | 0 | 0 | 0 | 0 |
| 0 | 0 | 0 | 1 | 1 | 0 |
| X address | 0 | 1 | 2 | 3 | 4 |

TABLE 8(b)

| Y address | | | | | |
|---|---|---|---|---|---|
| 2 | 0 | 0 | 0 | 0 | 0 |
| 1 | 0 | 0 | 0 | 0 | 0 |
| 0 | 0 | 1 | 0 | 1 | 0 |
| X address | 0 | 1 | 2 | 3 | 4 |

Figure 5:
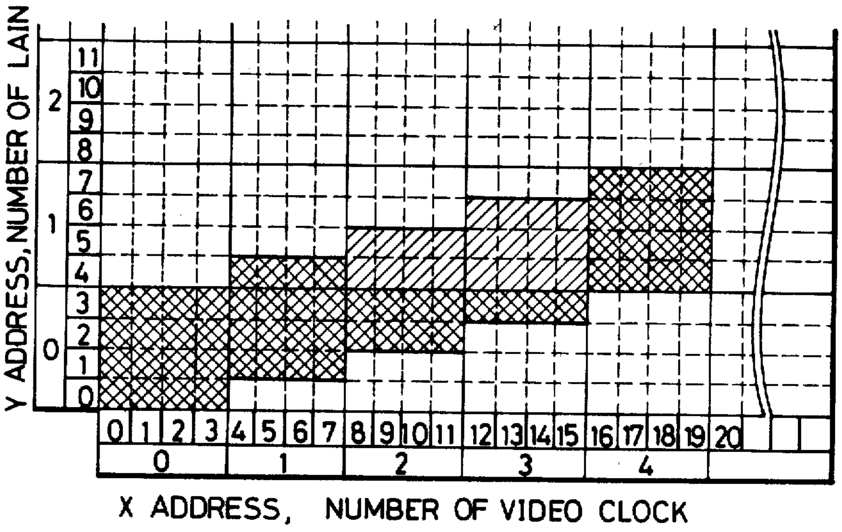
FIGS. 5 and 6 illustrate the operation of the same device.

When a dot clock signal $CK_1$ is outputted synchronouly with a vertical synchronizing signal at the time of completion of the storing of these data, the data (1, 0, 0, 0) on the leading addresses (0, 0) in the image memory 2 and correction memory 3 are latched to output (1, 1, 1, 1) from the PX decoder 7, (1) from the PY selector 8, and the picture element data ($P_1$, $P_2$, $P_3$, $P_4$)=(1, 1, 1, 1) from the P-gate 9. Consequently, the image signals ($G_1$, $G_2$, $G_3$, $G_4$)=(1, 1, 1, 1) are outputted in parallel from the output gate 17 to the shift register 18 irrespective of the data from the L-gate and U-gate 16. These signals are outputted as image signals synchronously with a video clock signal $CK_2$ bit by bit. The signals from the addresses (1, 0), (2, 0), (3, 0) include a "1" signal in the correction data, and the data on the address (4, 0) are (0, 0, 0, 0) including no "1" signals. Accordingly, (0, 0, 0, 0) is outputted from all of the P-gate 9, L-gate 12 and U-gate 16, and a "1" signal is not as the image signals ($G_1$, $G_2$, $G_3$, $G_4$). As a result, the image signals for the first raster become (1, 1, 1, 1, 0, 0, 0, . . . 0, 0) and are displayed as in the portion of FIG. 5 which corresponds to the line number of zero. When a second horizontal synchronizing signal is outputted, the reading of the dot data D (x, y) and correction data V (x, y), Q (x, y) is started from the same addresses as in the preceding step in the image memory 2 and correction memory 3, i.e. (X=0, 1 . . . 4 . . . , Y=0). During this scanning operation, the line count signals ($l_1$ $l_0$) become (0 1), and a "1" signal is outputted from the selector 8 when the addresses (0, 0), (1, 0) are read, so that (1, 1, 1, 1) are outputted from the P-gate 9 when the addresses (0, 0), (1, 0) are read. In consequence, the image signals (1, 1, 1, 1, 1, 1, 1, 1, 0, 0, 0 . . . 0, 0) are outputted from the shift register 18, and a line corresponding to the line number 1 is displayed. The outputs from the P-gate 9 cause the output number of (1, 1, 1, 1) signals to increase as the X address increases, until the line count signals ($l_1$ $l_0$) become (1 1), i.e. until the scanning spots become four, so that the length of a segment to be displayed increases. When the number of rasters becomes four, the PU selector 13 latches the dot data D (x, y) and correction data V (x, y), Q (x, y) in the lines being read at present, i.e. the addresses (X=0, 1, 2, 3 . . . , Y=0), to output signals to the U-shift registers 14.

The signals (0, 0, 0, 0) are stored in all of the addresses (X=0, 1, 2, 3 . . . , Y=1) except the address in which X=4 in the image memory 2. Accordingly, when the corresponding addresses are read, (0, 0, 0, 0) are outputted from the P-gate. On the address (4, 1) in the memories 2, 3, (1, 0, 0, 0) are stored, and, therefore, (1, 1, 1, 1,) are outputted from the P-gate 9. On the other hand, among the data outputted from the U-shift register 14, the data on the addresses (X=1, 2, 3, Y=1) include a "1" signal in the dot data and correction amount data. Accordingly, (1, 1, 1, 1) are outputted with respect to the addresses (X=1, 2, 3, Y=1) from the U-gate 14. Consequently, (0, 0, 0, 0, 1, 1, 1, 1, 1, 1, 1, 1, 1, 1, 1, 1, 1, 1, 1, 0, 0 . . . 0, 0) are outputted form the shift register 18 to draw a line corresponding to the line number 5 shown in FIG. 5. Similarly, when the line count signals ($l_1$ $l_0$) become (0 1), (1, 1, 1, 1) are outputted with respect to the addresses (X=2, 3, Y=1) from the U-gate 16, so that a line is drawn for the 8–19th periods of the video clock signal $CK_2$.

The displayed segment which becomes shorter every time the line number increases is shifted in the scanning direction by repeating such steps, to draw a generally smooth, rightwardly-rising line.

Figure 10A:
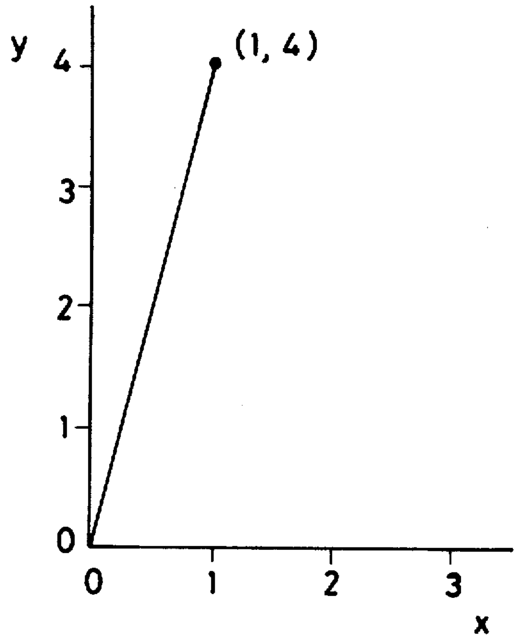
PRIOR ART FIG. 10A
Figure 10B:
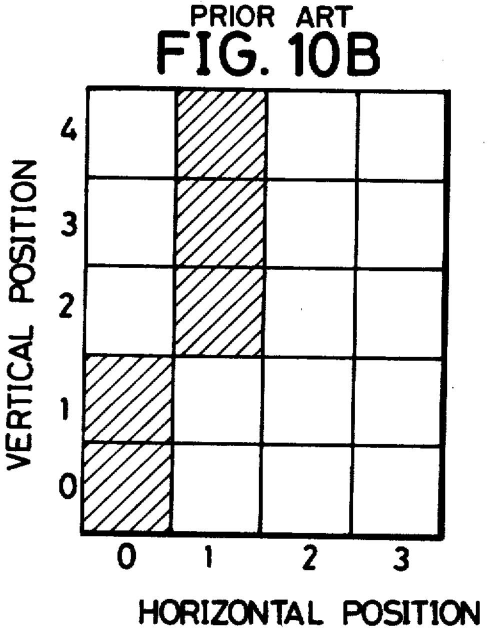
PRIOR ART FIG. 10B

An example of the displaying of a nearly vertical line vector which is expressed by a starting point (0, 0) and a terminal point (1, 4) as shown in FIG. 10A will now be described on the basis of Table 9.

TABLE 11

| Y address | X address 0 | 1 | 2 |
|---|---|---|---|
| 4 | 0 | 0 | 0 |
| 3 | 0 | 0 | 0 |
| 2 | 0 | 0 | 0 |
| 1 | 0 | 0 | 0 |
| 0 | 0 | 0 | 0 |

TABLE 9

| | | | | | | | | | | | | | | | | | | | | | |
|---|---|---|---|---|---|---|---|---|---|---|---|---|---|---|---|---|---|---|---|---|---|
| Line number | | 0 | 1 | 2 | 3 | 4 | 5 | 6 | 7 | 8 | 9 | 10 | 11 | 12 | 13 | 14 | 15 | 16 | 17 | 18 | 19 |
| Line count | | 00 | 01 | 10 | 11 | 00 | 01 | 10 | 11 | 00 | 01 | 10 | 11 | 00 | 01 | 10 | 11 | 00 | 01 | 10 | 11 |
| Reading address | X | 012 | 012 | 012 | 012 | 012 | 012 | 012 | 012 | 012 | 012 | 012 | 012 | 012 | 012 | 012 | 012 | 012 | 012 | 012 | 012 |
| on memory | Y | 0 | | | | 1 | | | | 2 | | | | 3 | | | | 4 | | | |
| P | D (x, y) | * | * | * | * | * | * | * | * | * | * | * | * | * | * | * | * | * | * | * | * |
| I | V (x, y) | | | | | | | | | | | | | | | | | | | | |
| F | $Q_1$ (x, y) | | | | | | | | | * | * | * | * | * | * | * | * | | | | |
| F | $Q_0$ (x, y) | | | | | * | * | * | * | | | | | * | * | * | * | | | | |
| Selecting signal $S_1$ | | *** | *** | *** | *** | *** | *** | *** | *** | *** | *** | *** | *** | *** | *** | *** | *** | *** | *** | *** | *** |
| P- | $P_1$ | * | * | * | * | * | * | * | * | * | * | * | * | * | * | * | * | * | * | * | * |
| gate | $P_2$ | * | * | * | * | * | * | * | * | * | * | * | * | | | | | * | * | * | * |
| | $P_3$ | * | * | * | * | * | * | * | * | | | | | | | | | * | * | * | * |
| | $P_4$ | * | * | * | * | | | | | | | | | | | | | * | * | * | * |
| L | D (x-1, y) | * | * | * | * | * | * | * | * | * | * | * | * | * | * | * | * | * | * | * | * |
| | V (x-1, y) | | | | | | | | | | | | | | | | | | | | |
| F | Q (x-1, y) | | | | | | | | | * | * | * | * | * | * | * | * | | | | |
| F | Q (x-1, y) | | | | | * | * | * | * | | | | | * | * | * | * | | | | |
| L- | $L_1$ | | | | | | | | | | | | | | | | | | | | |
| gate | $L_2$ | | | | | | | | | | | | | * | * | * | * | | | | |
| | $L_3$ | | | | | | | | | * | * | * | * | * | * | * | * | | | | |
| | $L_4$ | | | | | * | * | * | * | * | * | * | * | * | * | * | * | | | | |
| U- | D (x, y-1) | | | | | * | * | * | * | * | * | * | * | * | * | * | * | * | * | * | * |
| shift | V (x, y-1) | | | | | | | | | | | | | | | | | | | | |
| | Q (x, y-1) | | | | | | | | | | | | | * | * | * | * | * | * | * | * |
| | Q (x, y-1) | | | | | | | | | * | * | * | * | | | | | * | * | * | * |
| Selecting signal $S_2$ | | | | | | | | | | | | | | | | | | | | | |
| U- | $U_1$ | | | | | | | | | | | | | | | | | | | | |
| gate | $U_2$ | | | | | | | | | | | | | | | | | | | | |
| | $U_3$ | | | | | | | | | | | | | | | | | | | | |
| | $U_4$ | | | | | | | | | | | | | | | | | | | | |
| Out- | $G_1$ | * | * | * | * | * | * | * | * | * | * | * | * | * | * | * | * | * | * | * | * |
| put | $G_2$ | * | * | * | * | * | * | * | * | * | * | * | * | * | * | * | * | * | * | * | * |
| gate | $G_3$ | * | * | * | * | * | * | * | * | * | * | * | * | * | * | * | * | * | * | * | * |
| | $G_4$ | * | * | * | * | * | * | * | * | * | * | * | * | * | * | * | * | * | * | * | * |

TABLE 10

| Y address | X address 0 | 1 | 2 |
|---|---|---|---|
| 4 | 0 | 1 | 0 |
| 3 | 1 | 0 | 0 |
| 2 | 1 | 0 | 0 |
| 1 | 1 | 0 | 0 |
| 0 | 1 | 0 | 0 |

TABLE 12(a)

| Y address | X address 0 | 1 | 2 |
|---|---|---|---|
| 4 | 0 | 0 | 0 |
| 3 | 1 | 0 | 0 |
| 2 | 1 | 0 | 0 |
| 1 | 0 | 0 | 0 |
| 0 | 0 | 0 | 0 |

TABLE 12(b)

| Y address | | | |
|---|---|---|---|
| 4 | 0 | 0 | 0 |
| 3 | 1 | 0 | 0 |
| 2 | 0 | 0 | 0 |
| 1 | 1 | 0 | 0 |
| 0 | 0 | 0 | 0 |
| | 0 | 1 | 2 |
| | | X address | |

Figure 6:
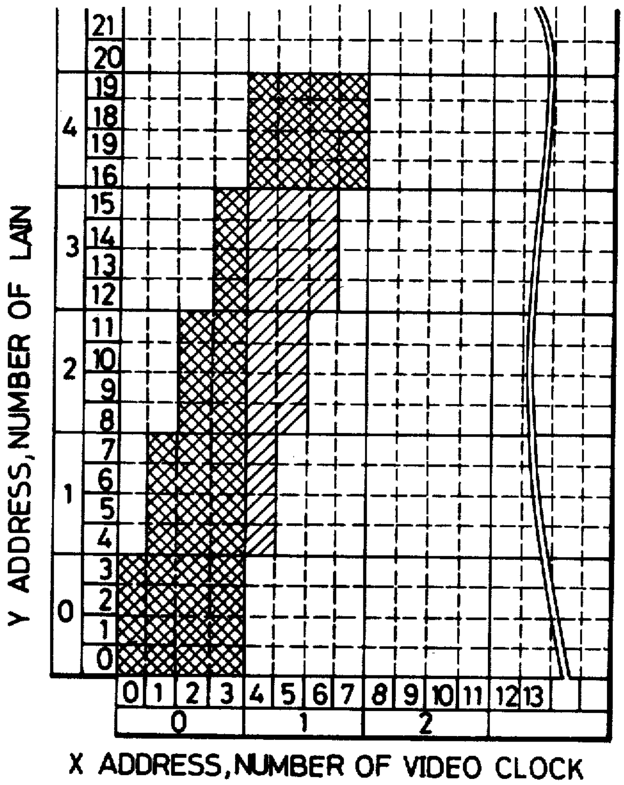
Figure 7:
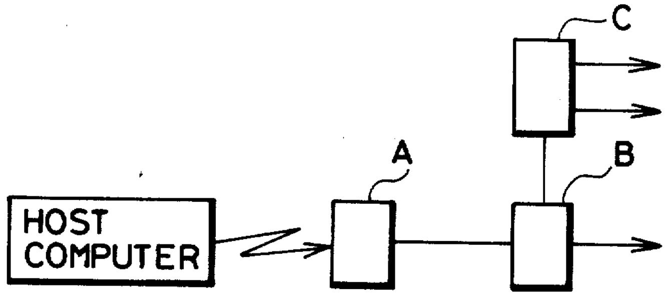
PRIOR ART FIG. 7
FIG. 7 is a block diagram of an example of a conventional graphic display.
Figure 8:
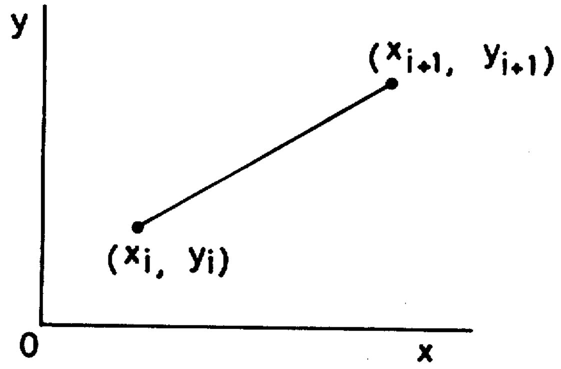
PRIOR ART FIG. 8
FIG. 8 illustrates an example of a line vector.

When a vector signal is inputted into the arithmethic circuit, the equation (2), i.e.

$$X = \frac{x_{i+1} - x_i}{y_{i+1} - y_i} \cdot Y$$

is selected to determine X=0.25·Y, and the values of X (X=0, Y=0), (X=0.25, Y=1), (X=0.5, Y=2), (X=0.75, Y=3), (X=1, Y=4) by using Y=1, 2, 3, 4 as independent variables. A "1" signal is then stored in the addresses, each of which consists of integer parts of X and Y, i.e. (0, 0), (0, 1), (0, 2), (0, 3), (1, 4), in the image memory 2 (Table 10), and a "0" signal in the other addresses therein, a "0" signal in the direction memory (Table 11) in which the correction direction occurs in the X-direction, and an upper 2 bit, which is obtained by converting the fraction part into a binary signal, in the correction amount memory (Tables 12a and 12b). When a dot clock signal is outputted synchronously with a vertical synchronizing signal at the time of completion of the storing of these data, the data (1, 0, 0, 0) on the address (0, 0) are latched by the P-FF 6, so that (1, 1, 1, 1), a "1" signal and (1, 1, 1, 1) are outputted from the PX decoder 7, PY selector 8 and P-gate 9, respectively. Consequently ($G_1$, $G_2$, $G_3$, $G_4$)=(1, 1, 1, 1) are outputted in parallel from the output gate 17 to the shift register 18 irrespective of the outputs from the L-gate 12 and U-gate 16. Since the dot data on the addresses (1, 0), (2, 0) . . . do not include a "1" signal, (0, 0, 0, 0) are outputted from the P-gate 9, L-gate 12 and U-gate 16. When this area, i.e. (0, 0), (1, 0), (2, 0) . . . are repeated until the line count signals ($l_1$ $l_0$) become (1 1), the line corresponding to the line numbers 0–3 in FIG. 6 is drawn. When the data are then read from the addresses (0, 1) in the memories 2, 3, the data (1, 0, 0, 1) are outputted therefrom, and (1, 1, 1, 0) from the PX decoder 7, so that (1, 1, 1, 0) are outputted from the P-gate 9. On the other hand, the data (0, 0, 0, 0) on the preceding address are latched in the L-flip-flop 10, and (1, 0, 0, 0) are outputted from the U-shift register 14. Accordingly, (0, 0, 0, 0) are outputted from the L-gate 12 and U-gate 16. Hence, (1, 1, 1, 0) are inputted into the output gate 17, and (0, 1, 1, 1, 0, 0 . . . ) are outputted serially from the shift register 18. After the reading of the addresses (0, 1) is completed, the reading of the addresses (1, 1) is started. Since a "1" signal is not included in the dot data D (x, y), (0, 0 , 0, 0) are outputted from the P-gate 9. On the other hand, the data (1, 0, 0, 1) on the preceding address (0, 1) are latched in the L-FF 10. Therefore, (0, 0, 0, 1) are outputted from the L-gate 12, and these signals are synthesized in the output gate to be outputted as (0, 1, 1, 1, 1, 0, 0 . . . ) from the shift register 18, so that the line corresponding to the line number 4 is drawn. An image signal shifted in the scanning direction by one video clock period is then output in every four a scanning operation to draw a smooth line.

In this embodiment, one line address X=0, 1, 2 . . . is scanned 4 times. It is needless to say that, if the scanning is done a different plurality of times, the same operational effect can be obtained.

According to the present invention described above, not only the dot data but also the correction direction data and correction amount data are determined on the basis of the coordinate values of the starting and terminal points of a line vector, and the time of generation of an image signal is shifted with reference to the correction direction data and the correction amount data. Therefore, the line vector can be displayed very smoothly in comparison with the capacities of the memories. Namely, the invention can provide at a low cost a raster scan type graphic display having a high resolving power.

What is claimed is:

1. A line smoothing circuit for a raster scanning type display unit in which a raster of scan lines define a display picture frame and the dot display within the respective scan lines is controlled by display signals, the line smoothing circuit comprising: computing means receptive of starting point and terminal point coordinate data during use of the line smoothing circuit for computing therefrom display data representative of a line image to be displayed and line-smoothing correction data representative of corrections to be made to the display data to smoothen the line image; memory means for storing the display data and line-smoothing correction data at addresses corresponding to respective addresses of a display picture frame; and circuit means for reading out the stored display data and line-smoothing correction data from the respective addresses of the memory means and effecting the correction of the display data in accordance with the line-smoothing correction data to produce display signals effective to display a smooth line image.

2. A line smoothing circuit according to claim 1; wherein the computing means includes means for computing direction of correction data and amount of correction data; and the memory means includes means for storing the direction of correction data and the amount of correction data at addresses corresponding to respective addresses of the display picture frame.

3. A line smoothing circuit according to claim 2; wherein the memory means comprises an image memory for storing the display data, and a correction memory for storing the direction of correction data and amount of correction data.

4. A line smoothing circuit according to claim 3; wherein the correction memory has plural sections the number of which is dependent upon the number of scan lines per address.

5. A line smoothing circuit according to claim 2; wherein the memory means has means for enabling the parallel reading out of the display data and line-smoothing correction data; and the circuit means has means for reading out in parallel the stored display and correction data.

6. A line smoothing circuit according to claim 1; wherein the memory means has means for enabling the parallel reading out of the display data and line-smoothing correction data; and the circuit means has means for reading out in parallel the stored display and correction data.

7. A line smoothing circuit according to claim 1; wherein the circuit means includes means for temporarily retaining the display and correction data read out for a preceding address, and means for effecting the correction of the display data in accordance with the retained data.

8. A line smoothing circuit according to claim 1; wherein the circuit means includes means for effecting the correction of the display data by controlling the dot location of the dot display within the scan lines.

9. A line smoothing circuit according to claim 8; wherein the means for effecting the correction of the display data by controlling the dot location comprises means for determining the dot location from the data read out for a preceding address and scan line.

10. A line smoothing circuit according to claim 9; wherein the memory means includes means for storing the display data and correction data at addresses each of which covers a plurality of scan lines in each direction of the display picture frame.

11. A line smoothing circuit according to claim 10; wherein the computing means includes means for computing direction of correction data and amount of correction data; and the memory means includes means for storing the direction of correction data and the amount of correction data at addresses corresponding to respective addresses of the display picture frame.

12. A line smoothing circuit according to claim 1; wherein the memory means includes means for storing the display data and correction data at addresses each of which covers a plurality of scan lines in each direction of the display picture frame.

13. A graphic display system in which a line is displayed on a raster scan display unit by reference to its starting and terminating coordinates expressed as addresses, each address covering a plurality of scan lines in each direction, the system including: computing means to compute for each address from the starting and terminating coordinate data, display data and line smoothing correction data including direction of correction data and correction amount data, and logical circuitry responsive to such data read for each address and to indications of scan line identity within the address, to generate display signals for the raster scan display unit which display signals control the dot display within individual scan lines to smooth the line display.

14. A system according to claim 13; in which the display and correction data are stored at corresponding addresses in parallel-read memories.

15. A system according to claim 14; in which the correction amount data memory is divided into sections, whose number is dependent upon the number of scan lines per address.

16. A system according to claim 15; in which the logical circuitry retains such data read for a preceding address to provide a further input for the generation of display signals.

17. A system according to claim 14; in which the logical circuitry retains such data read for a preceding address to provide a further input for the generation of display signals.

18. A system according to claim 13; in which the logical circuitry retains such data read for a preceding address to provide a further input for the generation of display signals.

* * * * *